United States Patent

Miwa

[11] Patent Number: 5,150,981
[45] Date of Patent: Sep. 29, 1992

[54] BALL JOINT ASSEMBLY HAVING AN EXTENDED BALL SURFACE

[75] Inventor: Ikuhisa Miwa, Seki, Japan

[73] Assignee: Nippon Thompson Company, Ltd., Tokyo, Japan

[21] Appl. No.: 759,181

[22] Filed: Sep. 10, 1991

Related U.S. Application Data

[63] Continuation of Ser. No. 251,147, Sep. 29, 1988, abandoned.

[30] Foreign Application Priority Data

Sep. 29, 1987 [JP] Japan .................. 62-242554

[51] Int. Cl.⁵ ............................................. F16C 11/06
[52] U.S. Cl. .................................. 403/122; 403/134; 29/898.052
[58] Field of Search ............. 403/128, 122, 124, 125, 403/131, 134, 288, 90; 29/898.052, 899; 72/88, 108

[56] References Cited

U.S. PATENT DOCUMENTS

| | | | |
|---|---|---|---|
| 2,922,670 | 1/1960 | Davies et al. | 403/134 |
| 3,027,182 | 3/1962 | Reuter | 403/134 |
| 3,126,612 | 3/1964 | Poirier | 29/898.052 |
| 3,187,543 | 6/1965 | Roehrs | 29/898.052 X |
| 3,253,845 | 5/1966 | Davies | 403/122 |
| 3,506,290 | 4/1970 | Gottschald | 403/134 |
| 3,982,843 | 9/1976 | Sirek | 403/122 X |
| 4,572,693 | 2/1986 | Nemoto | 403/134 |
| 4,679,958 | 7/1987 | Mizusawa et al. | 403/122 X |
| 4,704,043 | 11/1987 | Hackman et al. | 403/90 X |
| 4,758,110 | 7/1988 | Ito | 403/122 X |
| 4,776,720 | 10/1988 | Nolen | 403/122 X |

FOREIGN PATENT DOCUMENTS 134615 10/1981 Japan .................. 403/122

Primary Examiner—Peter M. Cuomo
Attorney, Agent, or Firm—Skjerven, Morrill, MacPherson, Franklin & Friel

[57] ABSTRACT

A ball joint or ball-and-socket joint assembly includes a ball unit terminating in a ball at one end and a socket unit terminating in a socket at one end, whereby the ball of the ball unit is movably received in the socket of the socket unit, so that the ball unit may move relative to the socket unit over a predetermined angle in all planes passing through a common center line defined by the socket. The ball unit includes a ball section, a cut-away section, a nut section and a threaded section in the order mentioned from top to bottom, and the ball section includes an extended portion which is formed by plastic deformation when the ball section is subjected to roll rolling and which partly extends into the space defined by the cut-away section to thereby provide an increased spherical contact surface which may be brought into sliding contact with a spherical surface of the socket.

4 Claims, 2 Drawing Sheets

5,150,981

BALL JOINT ASSEMBLY HAVING AN EXTENDED BALL SURFACE

This application is a continuation of application Ser. No. 07/251,147, filed Sep. 24, 1988, now abandoned.

BACKGROUND OF THE INVENTION

1. Field of the Invention

This invention generally relates to a ball joint assembly, which is also called a ball-and-socket joint assembly, and, in particular, to a ball unit for use in a ball joint assembly including a ball unit and a socket unit operatively coupled to the ball unit.

2. Description of the Prior Art

A ball joint assembly or ball-and-socket joint assembly is well known in the art, and it generally includes a ball unit having a ball portion and a socket unit having a socket portion in which the ball portion of the ball unit is received. In such a ball joint assembly, the ball unit may move relative to the socket unit within a certain angle in all planes passing through a center line defined by the socket portion of the socket unit. The prior art ball unit for use in such a ball joint assembly generally includes three sections, i.e., (1) a ball portion, (2) a nut (tightening) section, and (3) a threaded or holding section, arranged in the order mentioned along a longitudinal center line of the ball unit from one end to the other. In addition, a cut-away section is typically provided in the form of a circumferential groove between the ball and nut sections for manufacturing reasons.

In accordance with a typical prior art method of manufacturing a ball unit of a ball joint assembly, a columnar member is first processed by cold heading to thereby form an intermediate product which has an outer shape substantially close to a finished product. Then, only the ball portion of the intermediate product is processed by roll rolling at high precision, so that there is obtained a second intermediate product which has an outer shape very similar to that shown in FIG. 3. Thereafter, a cut-away portion is provided between the ball and nut sections in the form of a circumferential groove and then the intermediate product is also processed by thread rolling to thereby form a threaded section to complete the manufacture of the ball unit.

In a cold heading process, a columnar member of raw material is fed into a cavity defined between a pair of top and bottom mold halves in contact, defining a predetermined shape of its inner surface. As a result, the shape of the mold cavity must be made smaller gradually deeper into the cavity along its longitudinal axis, otherwise the product thus processed by cold heading cannot be removed from the cavity. In the present case, since the center of the ball portion of a ball unit to be manufactured is defined as a split plane between the two mold halves, the ball unit must have a structure whose outer shape becomes gradually smaller from its ball portion toward its threaded portion along the longitudinal axis of the ball unit (see FIG. 3). If it is desired to extend the ball section beyond the diameter which is defined by the maximum diameter defined by the nut section which is adjacent to the ball section so as to provide an increased spherical surface, the extended portion of the ball section is defined by a cutting process at the time when the cut-away section is formed between the ball and nut sections in the form of a circumferential groove. Accordingly, the extended portion naturally has a decreased precision as compared with the remaining portion of the ball section, so that the overall degree of sphericity tends to be reduced.

On the other hand, in the absence of such an extended portion, e.g., the ball section terminating in a cylindrical portion having the diameter D which is the diameter of the largest circle definable by the nut section, the ball section presents only a limited spherical surface. Thus, when such a ball unit is combined with a socket unit by placing the ball section within the socket section of the socket unit, the contact surface between the ball and socket sections is limited, which tends to decrease the amount of load which can be borne between the ball and socket units.

SUMMARY OF THE INVENTION

In accordance with the principle of the present invention, there is provided a ball unit for use in ball joint assembly, which has an extended ball section. That is, in accordance with one embodiment of the present invention, there is provided a ball unit for use in a ball joint assembly, which comprises an extended ball section which includes an extended portion formed by plastic deformation at the bottom end of the ball section to define an extension of the spherical surface. In the preferred embodiment, a cut-away section is formed between the ball and nut sections of a ball unit and the bottom portion of the ball section is subjected to rolling to have its portion deformed plastically to thereby define the extended portion partly projecting into the space defined by the cut-away portion. Most preferably, a cylindrical portion having the diameter substantially corresponding to the diameter of the largest circle definable by the nut section is formed at the bottom of the ball section or the junction between the ball and nut sections, and this cylindrical portion is plastically deformed, preferably by rolling, to thereby form the extended portion of the ball section.

It is therefore a primary object of the present invention to obviate the disadvantages of the prior art as described above and to provide an improved ball joint assembly.

Another object of the present invention is to provide an improved ball joint assembly large in bearing capability and smooth and reliable in operation.

A further object of the present invention is to provide an improved ball unit for use in a ball joint assembly high in precision and large in load bearing capability.

A still further object of the present invention is to provide an improved ball unit for use in a ball joint assembly easy and inexpensive to manufacture and yet capable of providing a high and smooth motion relative to its associated socket unit when assembled.

Other objects, advantages and novel features of the present invention will become apparent from the following detailed description of the invention when considered in conjunction with the accompanying drawings.

DESCRIPTION OF THE PREFERRED EMBODIMENTS

Figure 1:
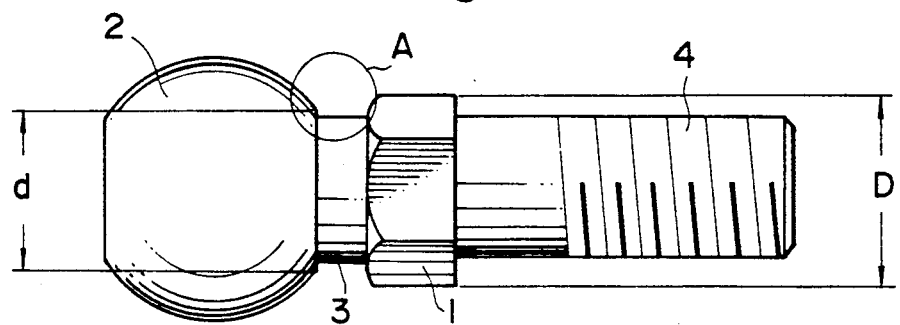
FIG. 1 is a schematic illustration showing in front view a ball unit for use in a ball joint assembly constructed in accordance with one embodiment of the present invention.

Referring now to FIG. 1, there is schematically shown a ball unit for use in a ball joint assembly constructed in accordance with one embodiment of the present invention. As shown, the ball unit generally includes a ball section 2 having a generally spherical shape, a cut-away section 3 in the form of a circumferential groove, a nut section 1 and a threaded section 4 arranged in the order mentioned from the left end to the right end along the longitudinal center line thereof. The ball section 2 is generally spherical in shape and it has a flat head at its top. As will be described in detail later, the ball section 2 has an extended portion at its bottom or at the connection between the ball and cut-away sections 2 and 3, and the diameter defined at the bottom of the ball section or extended ball section is indicated by d. Of importance, in accordance with the principle of the present invention, this diameter d is made significantly smaller than the diameter D of a largest circle which may be defined by the nut section 1. The fact that the diameter d of the bottom of the extended ball section 2 is much smaller than the diameter D of the nut section 1 indicates that the ball section 2 has a significantly increased spherical surface, especially extending into the space defined by the cut-away section 3.

In the preferred embodiment, the final finishing of the ball section 2 is carried out by a roll rolling process, so that there can be obtained a ball section having a high precision, e.g., the degree of sphericity of the ball section 2 being equal to or smaller than 0.02 mm. The threaded section 4 may be formed by thread rolling either before or after the roll rolling for final finishing of the ball section 2. If no thread is to be provided in this section, this section is formed by a columnar rod serving as a holding section.

Figure 2:
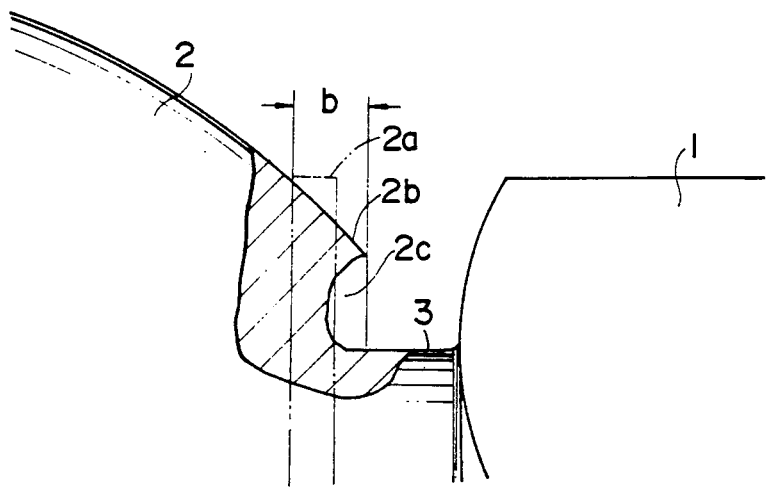
FIG. 2 is a partial cross-sectional and cut-away illustration showing on an enlarged scale the structure of the ball unit of FIG. 1 which is indicated by circle A.

FIG. 2 illustrates the portion of the ball unit of FIG. 1 which is indicated by circle A. As indicated by the two-dotted line, prior to a finishing rolling process, a cylindrical portion 2a is formed at the bottom or adjacent to the bottom of the ball section 2. This cylindrical portion 2a is, for example, formed when forming the cut-away section 3 by cutting while leaving a portion of the intermediate section between the ball and nut sections 2 and 1. Thus, this remaining cylindrical portion 2a is then plastically deformed, for example, by roll rolling, to thereby define an extended portion 2b which defines an extended spherical portion of the ball section 2 as an extension of the spherical surface defined by the ball section 2. That is, this extended portion 2b provides an extended spherical surface extending over a distance b in the axial direction. Since the extended portion 2b is formed at the same time when the ball section 2 is subjected to a finishing process, so that there is provided an increased, smooth spherical surface at high precision. Since the overall spherical surface area increases because of the formation of an extended portion 2b, the overall load bearing capability also increases. The remaining space 2c of the cut-away section 3 is defined as a free space which serves as an oil pocket or reservoir.

Figure 3:
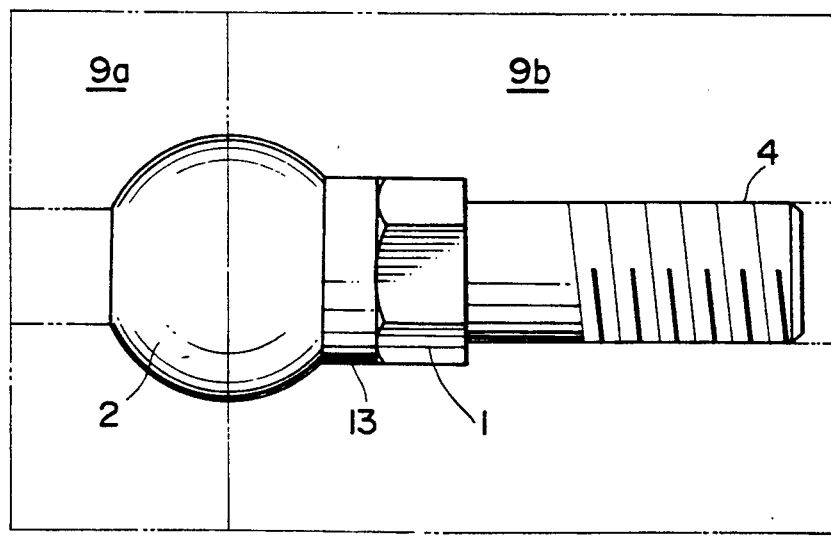
FIG. 3 is a schematic front view illustration showing a typical prior art ball unit of a ball joint assembly.

FIG. 3 illustrates an intermediate product which is formed after applying a cold heading process to a columnar member of raw material. FIG. 3 may also be viewed as a FIGURE to show a prior art ball unit of a ball joint assembly after roll rolling operation. In accordance with the prior art technique, since the cold heading and rolling operations were carried out in sequence in succession, it could not be avoided to form a relief section 13 between the ball and nut sections 2 and 1 with the relief section 13 having a diameter substantially equal to the largest size of the nut section 1. With the presence of such a relief section 13 whose diameter is substantially equal to the largest size of the nut section 1, the overall spherical surface presented by the ball section 2 is necessarily limited.

Figure 4:
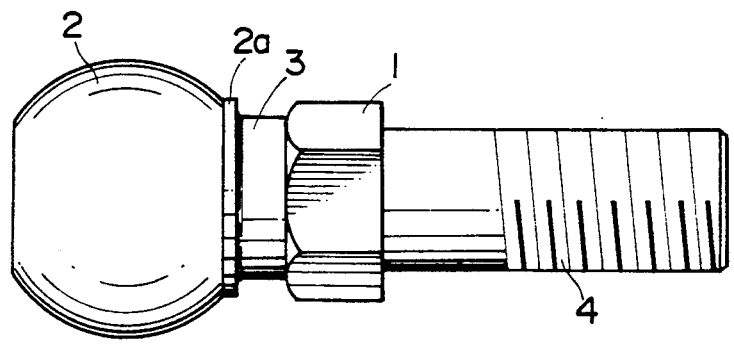
FIG. 4 is a schematic illustration showing in front view an intermediate product which is to be further processed to be formed into a ball unit of the present invention as shown in FIG. 1.
Figure 5:
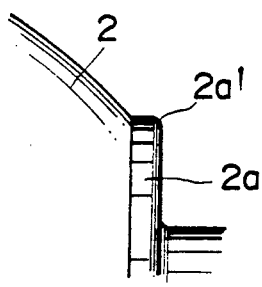
FIG. 5 is an illustration showing on an enlarged scale a portion of the ball unit shown in FIG. 4.

FIG. 4 illustrates an intermediate ball unit during the manufacture of a ball unit in accordance with one embodiment of the present invention. That is, in accordance with this embodiment of the present invention, a raw material is first processed by cold heading to obtain a first intermediate ball unit having a structure shown in FIG. 3. Then, the relief section 13 is cut away to define a cut-away section 3 in the form of a circumferential groove while leaving a portion 2a of the relief section 13 which is adjacent to the bottom of the ball section 2 over a predetermined distance. This remaining portion 2a of the relief section 13 is going to be plastically deformed when the ball section 2 is later subjected to roll rolling to finish the ball section 2. FIG. 5 shows as an alternative embodiment a part of the structure shown in FIG. 4, in which the bottom edge of the remaining portion 2a is beveled or rounded at 2a'. The provision of such a beveled or rounded edge 2a' is preferable because it effectively allows to prevent the formation of sharp edges when the remaining portion 2a is plastically deformed by roll rolling.

Figure 6:
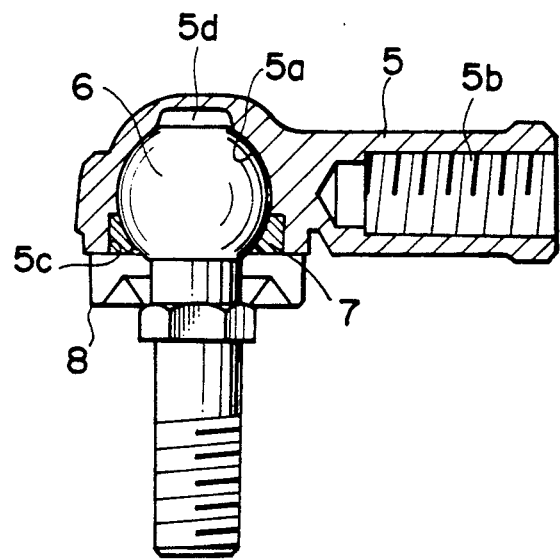
FIG. 6 is a schematic illustration showing partially in cross section a ball joint assembly which is constructed in accordance with one embodiment of the present invention and which includes the ball unit shown in FIG. 1 as an element.

FIG. 6 illustrates one example of a ball joint assembly constructed in accordance with one embodiment of the present invention, which includes a ball unit 6 and a socket unit 5. That is, the ball unit terminates in a ball section which is received in a socket section 5a which is formed at one end of the socket unit 5, which, in turn, is formed with a threaded section 5b for operative connection to another member. The ball section of the ball unit 6 is movably fitted in the socket section 5a of the socket unit 5, so that the ball unit 6 may move relative to the socket unit 5 over a predetermined angle in any desired direction. A seat 5c is formed at the mouth of the socket section 5a and a bush 7 is fixedly attached to the seat 5c to thereby keep the ball section of the ball unit 6 always received in the socket section 5a of the socket unit 5. Also provided is a dust cover 8 covering any gap between the socket unit 5 and the ball unit 6 to thereby prevent a lubricant present between the socket unit 5 and the ball unit 6 from being leaked away. An oil pocket 5d is formed in the socket section 5a of the socket unit 5, where the head or top of the ball unit 6 is normally located, and a quantity of lubricant oil is normally retained therein.

As described above, in accordance with the present invention, there is provided an improved ball joint assembly and a ball unit for use in a ball joint assembly, which is capable of withstanding an increased load and providing a smooth sliding operation over an increased angle. For example, while requiring a minimum change in the present process for manufacturing a ball unit of a ball joint assembly, there is provided a ball unit of a ball joint assembly high in accuracy and load bearing capability. The overall spherical surface is increased and the degree of sphericity is improved, so that there is provided a smoother relative motion between the ball unit and the socket unit. Since the overall spherical surface of the ball section of the ball unit is increased, the width of the bush 7 may be minimized, which, in turn, allows to provide an increased pivotal motion of the ball unit relative to the socket unit and to provide a cost reduction in manufacture. In addition, since there is provided an enhanced degree of sphericity, wobbling of the ball unit is prevented from occurring and thus there is provided a smooth relative motion between the ball unit and the socket unit.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A ball unit for use in a ball joint assembly, said assembly including a ball unit, which is generally elongated in shape and formed from a single columnar material, and a socket unit which may be operatively coupled thereto to provide a relative motion therebetween, said ball unit comprising:

a ball section formed at a top end of said ball unit and movably received in a socket section of said socket unit when assembled, said ball section providing a spherical contact surface contacting a spherical contact surface of said socket section;

a cut-away section formed immediately adjacent to said ball section and having a first diameter, said cut-away section being relatively short with respect to said ball section in a longitudinal direction of said ball unit;

a nut section formed adjacent to said cut-away section and having a nut shape and a second diameter which is a diameter of a largest circle definable by said nut section and which is greater than said first diameter; and a holding section formed adjacent to said nut section;

wherein said ball section includes an extended portion which partly extends longitudinally into and peripherally surrounds a space defined by said cut-away section and which is defined when said ball section is subjected to a ball deformation roll rolling process in the form of a circular cantilevered overhang having a substantially non-flat tip end of a predetermined portion of said ball section to thereby provide an extended spherical surface, said tip end defining a third diameter which is greater than said first diameter but smaller than said second diameter.

2. The assembly of claim 1, wherein said cut-away section is defined as a circumferential groove.

3. The assembly of claim 1, wherein said holding section is threaded at least partly.

4. The assembly of claim 1, wherein said ball section of said ball unit is flat-headed at a top end thereof.

* * * * *